United States Patent [19]

Kunimasa et al.

[11] Patent Number: 4,507,782
[45] Date of Patent: Mar. 26, 1985

[54] METHOD AND APPARATUS OF PACKET SWITCHING

[75] Inventors: Koichi Kunimasa, Hadano; Setsuo Futamura, Kanagawa; Jun Okada, Hadano, all of Japan

[73] Assignee: Hitachi, Ltd., Tokyo, Japan

[21] Appl. No.: 402,416

[22] Filed: Jul. 28, 1982

[30] Foreign Application Priority Data

Oct. 16, 1981 [JP] Japan .................. 56-164176

[51] Int. Cl.³ .................................. G06F 11/10
[52] U.S. Cl. ............................... 371/32; 371/37; 370/60
[58] Field of Search ............ 371/32, 37, 47, 48; 370/60, 94

[56] References Cited

U.S. PATENT DOCUMENTS

| | | | |
|---|---|---|---|
| 3,381,272 | 4/1968 | Pasini | 371/32 |
| 3,456,239 | 7/1969 | Glasson | 371/32 |
| 3,473,150 | 10/1969 | McClelland | 371/32 X |
| 4,074,232 | 2/1978 | Otomo et al. | 371/32 X |

Primary Examiner—Jerry Smith
Assistant Examiner—Mark Ungerman
Attorney, Agent, or Firm—Antonelli, Terry & Wands

[57] ABSTRACT

It is efficient to detect a data error, which is produced in a packet switching network, in a range between final users of data. A packet including data for detecting a data error is formed for a data unit made up of a series of data packets sent to a packet mode terminal, and send to the packet mode terminal. A data error is detected by the data for detecting a data error each time the above-mentioned series of data packets are received.

7 Claims, 6 Drawing Figures

50 ··· DATA PACKET
51 ··· ERROR CHECK PACKET

METHOD AND APPARATUS OF PACKET SWITCHING

The present invention relates to a communication control device in a packet mode terminal connected to a packet switching network, and more particularly to a communication system suitable for highly reliable data exchange.

A data error detecting function on the HDLC level (namely, the high level data link control level) between packet switching nodes has been hitherto used for detecting errors in data transmitted in a packet switching network. Accordingly, it is impossible to sufficiently improve the reliability of transmitted data.

FIG. 1 shows a conventional packet switching network. Referring to FIG. 1, data exchange between packet mode terminals (P.T.) 1 and 11 is performed in such a manner that data is sent from the terminal 1 to a packet switch 3 through a leased line 5. In this case, a frame checking sequence (hereinafter referred to as "FCS") on the HDLC level is added to each of the packets to be exchanged, to detect those errors in data which are produced between the terminal 1 and the packet switch 3. When the errors in data are detected, data transmission is again performed between the terminal 1 and packet switch 3 in accordance with a predetermined retry sequence to send normal data. Similar processing is performed between the terminal 11 and a packet switch 13. Further, those errors in data which are produced in data exchange between packet switches, can be detected at each pair of packet switches by checking an FCS added to each packet. FIG. 2 shows a fundamental format of a data packet. Referring to FIG. 2, one packet is divided into four fields, that is, a DLC header 21, a packet header 23, user data 24 and a DLC trailer 22. The DLC header 21 includes data indicating the start of a frame, and control data for DLC. The DLC trailer 22 includes data indicating the end of the frame and an FCS. The FCS is error detecting data which is formed, in accordance with a predetermined logic, from the remaining data in the packet other than the data indicating the start and end of the frame and the FCS per se.

As explained above, the data error detection in a packet switching network is carried out for each packet between a packet mode terminal and a packet switch and between packet switches. Such a method is mainly intended to detect a data error due to a fault on a transmission line.

However, in a packet switching network for transmitting data between packet mode terminals, a data error can be generated by a packet switch, though the probability of the generation of data error in a packet switch is smaller than that on a transmission line. FIG. 3 shows a data path in the case where data is transmitted between packet mode terminals through two packet switches. Referring to FIG. 3, data which is to be sent out from a packet mode terminal 1, is applied by an operator to a terminal control unit (TCU) 31, or is formed by a computer program in the unit 31. The data thus formed is sent through a communication control device (CCD) 32 to a packet switch 3 connected to a leased line 5. The packet switch 3 receives a packet at a communication control (C.C.) 33. At this time, an FCS which was added to the packet at the communication control device 32, is checked at the communication conrol 33. The results of checking are reported to a central control unit (CCU) 34. When the packet is received in the normal state, that is, the results of FCS checking are normal, the central control unit 34 specifies a packet switch, to which the packet is subsequently sent, on the basis of address data included in the packet header of the packet, to transfer the packet.

The central control unit 34 of the packet switch is usually formed of a programmable processor. The central control unit 34 requires a communication control (CC) 35 to send the packet to a packet switch 13. The communication control 35 sends the packet to a communication control (CC) 45, after having added a new FCS to the packet. The value of FCS added to a packet is usually varied each time the packet is transmitted between terminal and node and between nodes.

The packet switch 13 receives the packet at the communication control 45, and finally sends the packet to a packet mode terminal 11.

In the above-mentioned data transmission, the check on errors in data is made only between the communication control device 32 of the terminal 1 and the communication control 33 of the packet switch 3, between a communication control device 42 of the terminal 11 and the communication control 43 of the packet switch 13, and between the communication controls 35 and 45 of the packet switches 3 and 13. Accordingly, the above-mentioned data transmission system has such a drawback as mentioned below.

For example, in the case where data is destroyed in the central control unit 34 or 44 due to an error in a program, or an error in data is overlooked due to a temporary fault in an FCS check circuit of the communication control unit, the error in data is overlooked through the whole system, and exerts a great influence upon the service or operation performed between packet mode terminals.

It is accordingly an object of the present invention to make data exchange in a packet switching network more reliable by improving the probability of detection of a data error.

In general, it is efficient to detect a data error in a range between final users of data. In more detail, when data is transmitted between a pair of packet mode terminals, the data passes through many packet switches and transmission lines. Accordingly, data errors can be generated not only on the transmission lines but also in the packet switches, and therefore it is not sufficient to detect only data errors which are generated on the transmission lines by the FCS checking. In this case, it is required to have the ability to detect data errors generated in the packet switches. However, it is undesirable from the economical point of view to perform excessive processing in each packet switch in order to detect data errors generated in the packet switches, because the probability of generation of a data error due to a fault in the packet switches or an error in programs used in the packet switches is far smaller than the probability of generation of a data error on the transmission lines, and because such excessive processing makes each packet switch large in size and expensive.

Further, it is not required that data is highly reliable. For example, let up compare data in facsimile transmission with data in a banking online system. The data in facsimile transmission is visually checked by operator's eyes in the final stage, but the data in the banking online system is automatically processed by a computer. Accordingly, high reliability is required for the data in the banking online system, as compared with the data in a facsimile transmission. In other words, the degree of reliability required for data vaires with a user's service made in a packet switching network. In view of the above-mentioned fact, the present invention makes it possible to improve the reliability of data in a range between a pair of users, that is, a pair of packet mode terminals, without changing the data transmission sequence used in the network.

A characteristic feature of the present invention resides in that a series of data packets sent to a packet mode terminal are used as a data unit, a packet including data for detecting a data error is sent together with the data unit, and an error in data received by the terminal is checked at each data unit by the above-mentioned data for detecting a data error.

Now, the present invention will be explained below in detail with reference to the drawings, in which:

FIG. 4 shows a method for detecting a data error according to the present invention.

Figure 4:
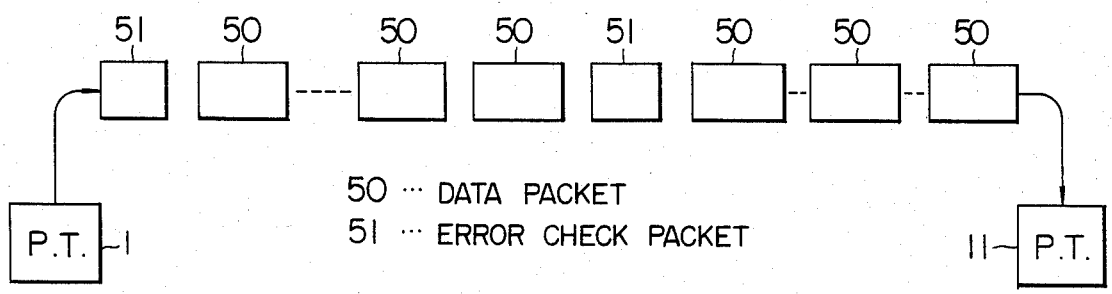
FIG. 4 is a view showing a method of packet transmission according to the present invention.

Referring to FIG. 4, a series of packets 50 each including data are sent from a packet mode terminal 1 to another packet mode terminal 11. Packets 51 each including data for detecting a data error are inserted in the above-mentioned series of packets. When a predetermined number of packets 50 have been sent from the terminal 1, or when packets 50 to be sent out are temporarily absent, the terminal 1 sends out a packet 51 including data for detecting a data error. The packet including data for detecting a data error is equivalent, in packet transmission sequence, with other packets 50 including user data, and it is not required to treat the packet including data for detecting a data error as a special packet in a packet switching network. When the packet including user data is received by the terminal 11, the terminal 11 forms an error check character for checking an error in the user data, from the received user data, in accordance with a sequence which has been determined between the terminals 1 and 11. The error check character thus formed is compared with data for detecting a data error when the packet 51 including the data for detecting a data error is received by the terminal 11, that is, a compare check is performed to know the presence or absence of data error.

Figure 1:
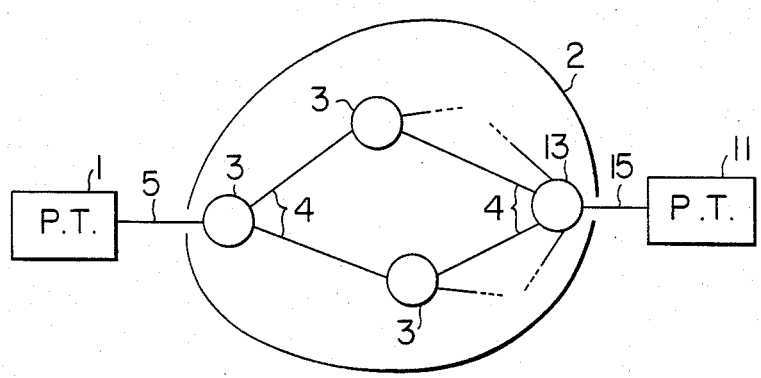
FIG. 1 is a view for giving a general idea of a packet switching network.
Figure 2:
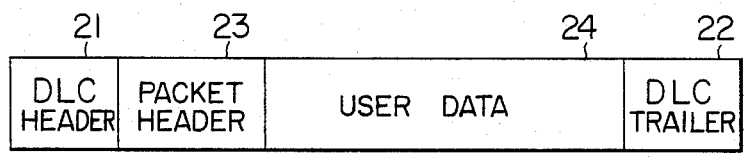
FIG. 2 shows a packet format.
Figure 3:
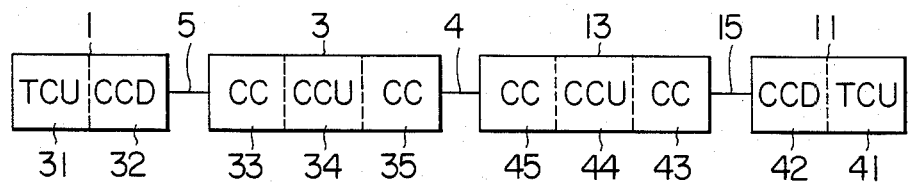
FIG. 3 is a view showing elements included in a packet switching network.
Figure 5:
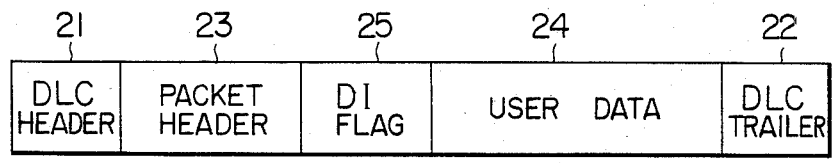
FIG. 5 shows a packet format used in the method shown in FIG. 4.

FIG. 5 shows an example of a packet format according to the present invention. The packet format shown in FIG. 5 is different from that shown in FIG. 2 in that a data identification flag 25 is added to the packet. The data identification flag 25 includes data necessary for a receiving terminal to judge whether the received packet is a packet including user data or a packet including data for detecting a data error. The user data portion of the format shown in FIG. 5 is shorter than that of the conventional format shown in FIG. 2 by an amount corresponding to the data identification flag 25. In other words, the data identification flag is a newly defined area interposed between the user data portion and the packet header portion of the conventional format.

In general, the communication control device is divided into an HDLC control unit, a packet level control unit, and a user data control unit. The HDLC control unit makes the numbering control, FCS control, frame control and response control in an HDLC. The packet level control unit makes the numbering control, response control and others on the packet level. The user data control unit divides user data into a plurality of packets to send the packets to the packet level control unit (that is, the packet control unit), and also combines packets received from the packet control unit into user data to send the user data to a user. In the case where the user is an operator operating a packet mode terminal, the user data is transferred from the packet control unit to a printer, a display device, or the like provided in the terminal. On the other hand, in the case where the communication control device is connected to a computer, the data which is to be sent to the user is applied to the computer in accordance with a sequence which has been determined between the communication control device and the computer.

Figure 6:
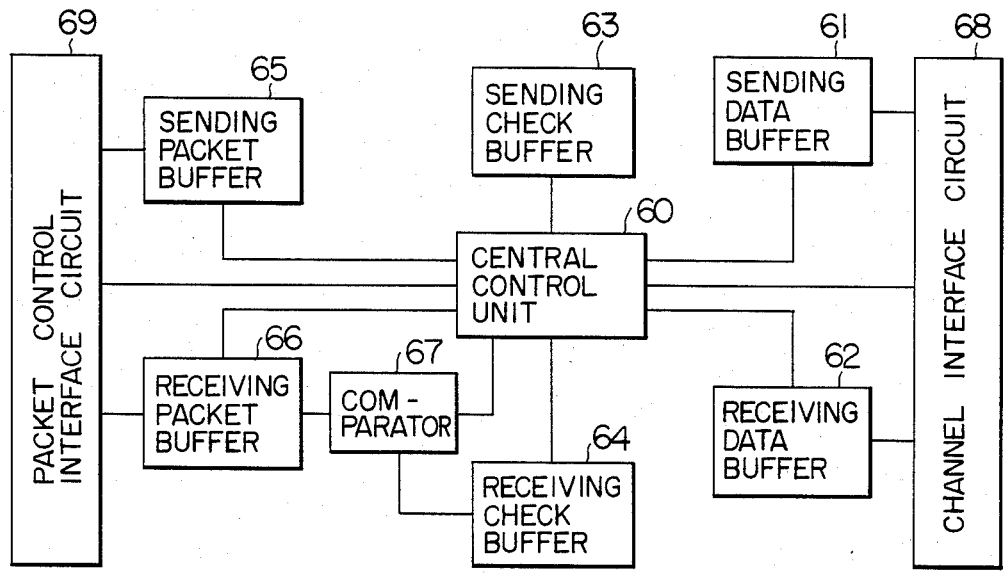
FIG. 6 is a block diagram showing an embodiment of a communication control device according to the present invention.

FIG. 6 shows an embodiment of a communication control device according to the present invention, which is connected to a computer. Since the HDLC control unit and packet control unit of the embodiment have no direct connection with the present invention, these units are omitted in FIG. 6, and only the user data control unit is shown in FIG. 6 and will be explained below in detail.

Referring to FIG. 6, a central control unit 60 requires a sending data buffer 61 to receive data to be sent on the basis of an instruction from a channel interface circuit 68. When the reception of the data by the sending data buffer 61 has been completed, data which a sending packet buffer 65 can accommodate is fetched from the sending data buffer 61 and transferred to the sending packet buffer 65. When the data is transferred from the buffer 61 to the buffer 65, check data is formed from the transferred data on the basis of a predetermined logic, for example, by summing up digits in the transferred data, to be stored in a sending check buffer 63. When one packet has been formed in the above-mentioned manner, the central control unit 60 requires a packet control interface circuit 69 to receive the packet from the sending packet buffer 65. When the packet control interface circuit 69 has received the packet, the completion of reception is reported to the central control unit 60. Then, the central control unit 60 fetches data from the sending data buffer 61, and further fetches the check data from the sending check buffer 63 to form new check data from these data, for example, by summing up these data. The new check data is stored in the sending check buffer 63, and the data fetched from the sending data buffer 61 is transferred to the sending packet buffer 65. The above-mentioned processing is repeated, and thus packets are successively edited from data stored in the sending data buffer 61 and transferred to the packet control unit. When the packets are transferred, a flag indicating that a packet includes ordinary user data is set in the data identification flag area of each packet. When all of the data stored in the sending data buffer 61 has been transferred, the check data stored in the sending check buffer 63 is fetched and transferred to the sending packet buffer 65. At this time, a flag indicating that this data is check data, namely, data for checking a data error, is set before the check data, and a packet thus formed is sent out.

Next, the receiving process will be explained.

The central control unit 60 fetches a data packet stored in a receiving packet buffer 66 and transfers the packet to a receiving data buffer 62, on the basis of an instruction from the packet control interface circuit 69. Simultaneously with this transfer, an error check character is formed from the transferred data packet, and stored in a receiving check buffer 64. In the above-mentioned manner, data packets are successively transferred from the receiving packet buffer 66 to the receiving data buffer 62. When the receiving packet buffer 66 receives a packet which has a data identification flag indicating that the packet includes data for checking a data error, the central control unit 60 instructs a comparator 67 to compare data in the receiving packet buffer 66 with data in the receiving check buffer 64. The comparator 67 compares these two data, and reports the results of comparison to the central control unit 60. When the results of comparison are normal, the central control unit 60 requires the channel interface circuit 68 to receive data, and the circuit 68 receives data from the receiving data buffer 62. When the results of comparison indicate that the two data disagree with each other, the central control unit 60 discards the above data. The present embodiment checks a data error in the above-mentioned manner.

While a preferred embodiment of a communication control device according to the present invention has been explained in the above description, the present invention can be realized not only by hardware but also by software. Further, when an error is detected in received data, the resending processing on the packet level can be preformed in accordance with a sequence on the packet level, without discarding the received data. That is a packet including data for detecting a data error is sent each time data the number of which is smaller than a window size number (that is, a parameter on the packet level) by one is sent, and a receiving packet mode terminal checks the presence or absence of an error in user data at each data of window size number. When the results of check are normal, a response indicating the completion of reception on the packet level is sent out.

Further, in the case where the sending data buffer and receiving data buffer are required to store large volumes of data, the data may be temporarily stored in an external storage such as a disk. Further, data for detecting a data error may be included in one packet together with user data.

As has been explained in the foregoing, according to the present invention, a data error which is generated in a packet switching network and cannot be detected in the prior art method, or a data error which is overlooked due to a fault in an error detecting mechanism per se, can be checked in a range between a pair of packet mode terminals between which data is exchanged and therefore the reliability of data is greatly improved.

What we claim is:

1. A packet switching method for a system in which data is transmitted in a plurality of data packets, each packet having a portion of the data, between packet mode terminals to exchange said data through said packet switching system, said method comprising the steps of:

forming an error determining packet including data formulated exclusively for detecting a data error as part of a data unit made up of a series of data packets to be sent to a packet mode terminal;

sending said data unit to said packet mode terminal; and detecting a data error by means of said error determining packet when the data unit is received by said packet mode terminal.

2. A packet switching method for a system in which data is transmitted in a plurality of data packets each having a part of the data between terminals through a packet switching network, said method comprising the steps of:

transferring said plurality of data packets to a terminal;

generating check data for detecting a data error for said plurality of packets;

forming an additional packet including said check data;

transferring said additional packet to the terminal; and checking a data error by using said check data at the terminal.

3. A packet switching method according to claim 2, wherein said checking step includes the step of generating at said terminal check data for the data included in said transferred data packets and comparing the check data with said check data of said transferred additional packet.

4. A packet switching method according to claim 3, wherein said additional packet includes a flag for identifying that the packet includes said check data.

5. A packet switching method according to claim 2, wherein each of said packets includes check data for the packet.

6. A packet mode terminal comprising:

a central control unit;

means including a sending data buffer for storing data to be transmitted;

means including a sending check buffer connected to said central control unit for storing check data formed on the basis of said data stored in said sending data buffer by said central control unit;

means including a sending packet buffer connected to said central control unit for storing at least one packet formed from said data stored in said sending data buffer and a packet formed from said check data by said central control unit;

means including a packet control unit for sending on a communication line said packets stored in said sending packet buffer and for receiving a packet from said communication line;

means including a receiving packet buffer for storing packets received by said packet control unit;

means including a receiving data buffer for storing data fetched from said receiving packet buffer by said central control unit;

means including a receiving check buffer connected to said central control unit for storing check data formed from received data by said central control unit; and comparator means operated when said central control unit detects that said receiving packet buffer has received check data for comparing said receiving check data with said check data stored in said receiving check buffer.

7. The packet mode terminal according to claim 6, wherein said check data stored in said sending check buffer is formed as a packet with a flag for identifying that the packet includes said check data.

* * * * *